Patented Oct. 17, 1950

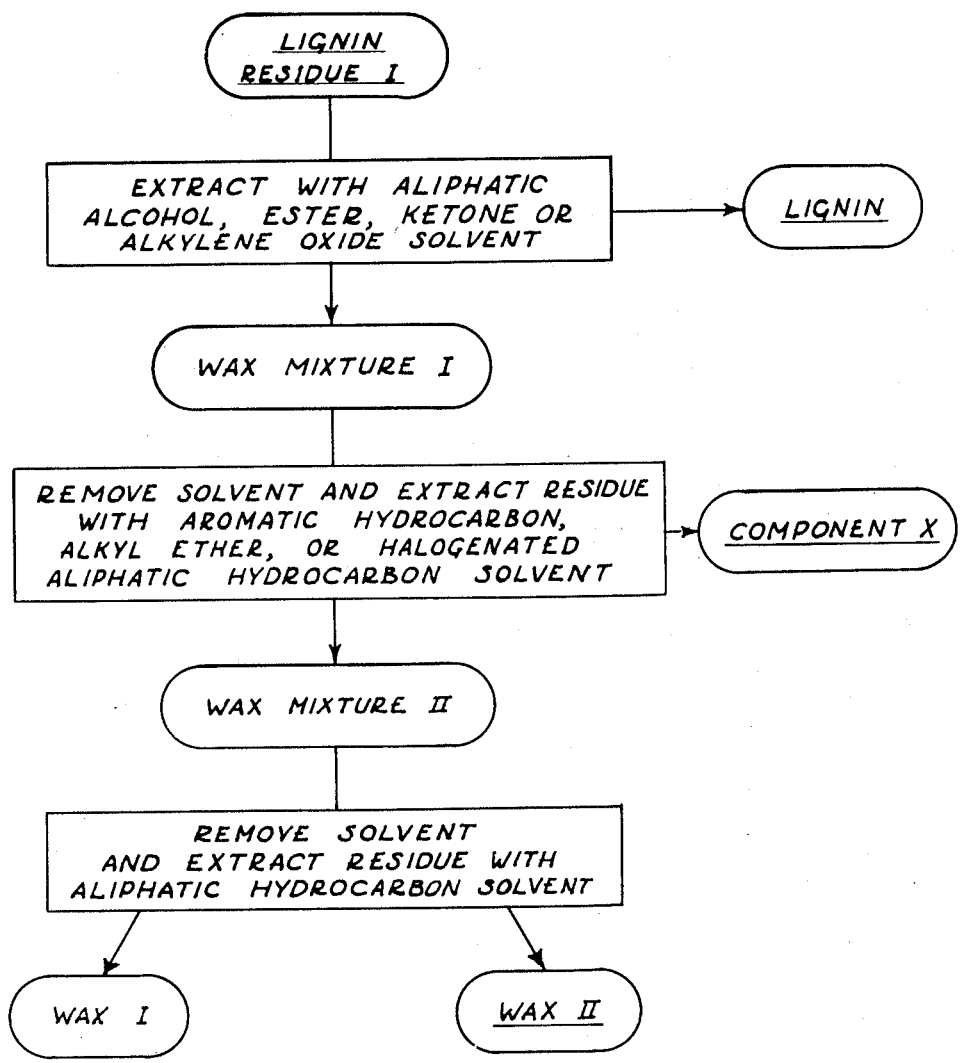

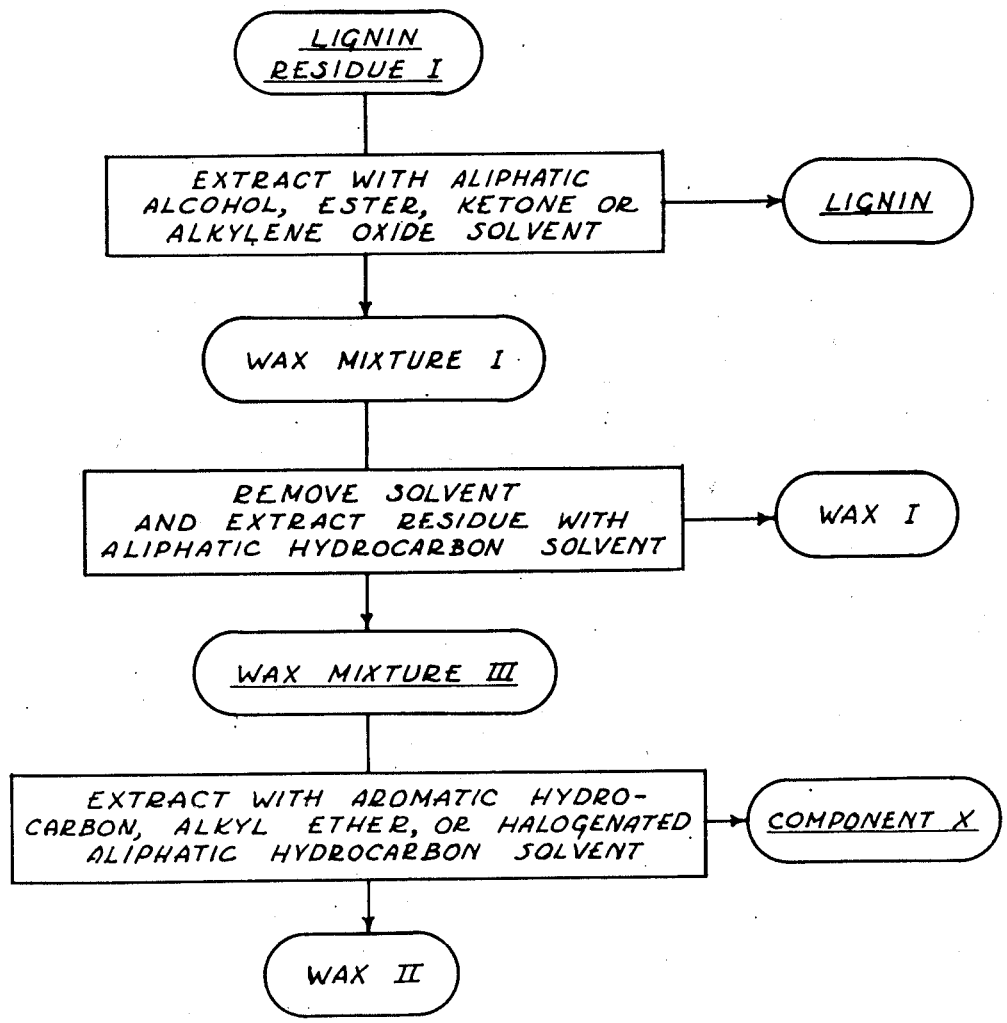

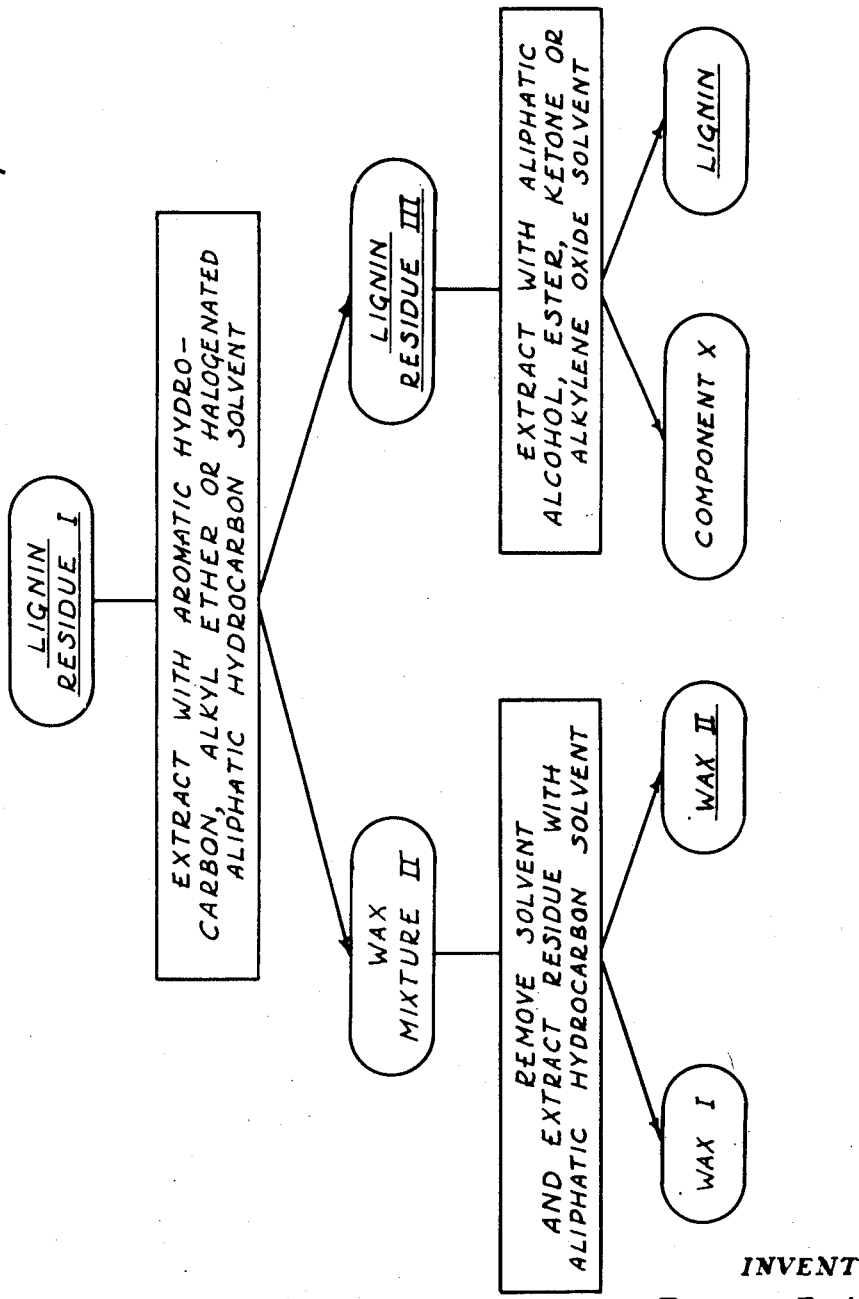

2,526,607

UNITED STATES PATENT OFFICE 2,526,607

WAXES AND THEIR PRODUCTION FROM WOOD WASTE

Ervin F. Kurth, Corvallis, Oreg., assignor to State of Oregon, acting by and through the Oregon State Board of Forestry Application April 5, 1948, Serial No. 18,878

41 Claims. (Cl. 260—412)

This invention relates to valuable wax products and to a process for their production in commercial quantities from bark, slabwood, sawdust, shavings and other wood waste, which process, broadly stated, comprises hydrolyzing the cellulose and hemicellulose content of the wood waste with acid, separating the resulting sugar-containing solution from the lignin residue, and extracting the latter with suitable solvents for recovery of the wax and for separating it into well defined fractions.

The present invention resulted from the observation that the lignin residue obtained from the hydrolysis of wood waste with dilute sulfuric acid had pronounced water-repelling properties. Water inadvertently dropped on it did not wet it, but was shed in the form of discrete globules. Lignin is wettable by water. Shedding of water by the lignin residue therefore indicated the presence of appreciable quantities of non-ligneous material, and an investigation was conducted to work out a process for isolating it and for determining its identity. It was found to be a mixture of waxes which could be separated from the lignin in substantial quantity and resolved into two well defined wax fractions. The present invention therefore affords for the first time a practical, economical method for obtaining useful waxes in commercial quantities from wood waste. This is of particular economic significance since the value of the wax obtained, coupled with the value of the sugar-containing solution, the lignin and the other products of the hydrolytic process is sufficient to make profitable the treatment of wood waste, hitherto discarded or used as fuel, for the recovery of useful chemical products therefrom.

The manner in which waxes are obtained from wood waste in accordance with the present invention may best be described with reference to the accompanying drawings, wherein:

Figure 2 is a flow plan illustrating an alternative method for obtaining waxes from wood waste in accordance with the present invention;

Figure 3 is a flow plan illustrating still another process for producing waxes from wood waste as disclosed herein; and Figure 4 is a flow plan of the process of the invention in still another of its embodiments.

Figure 1:
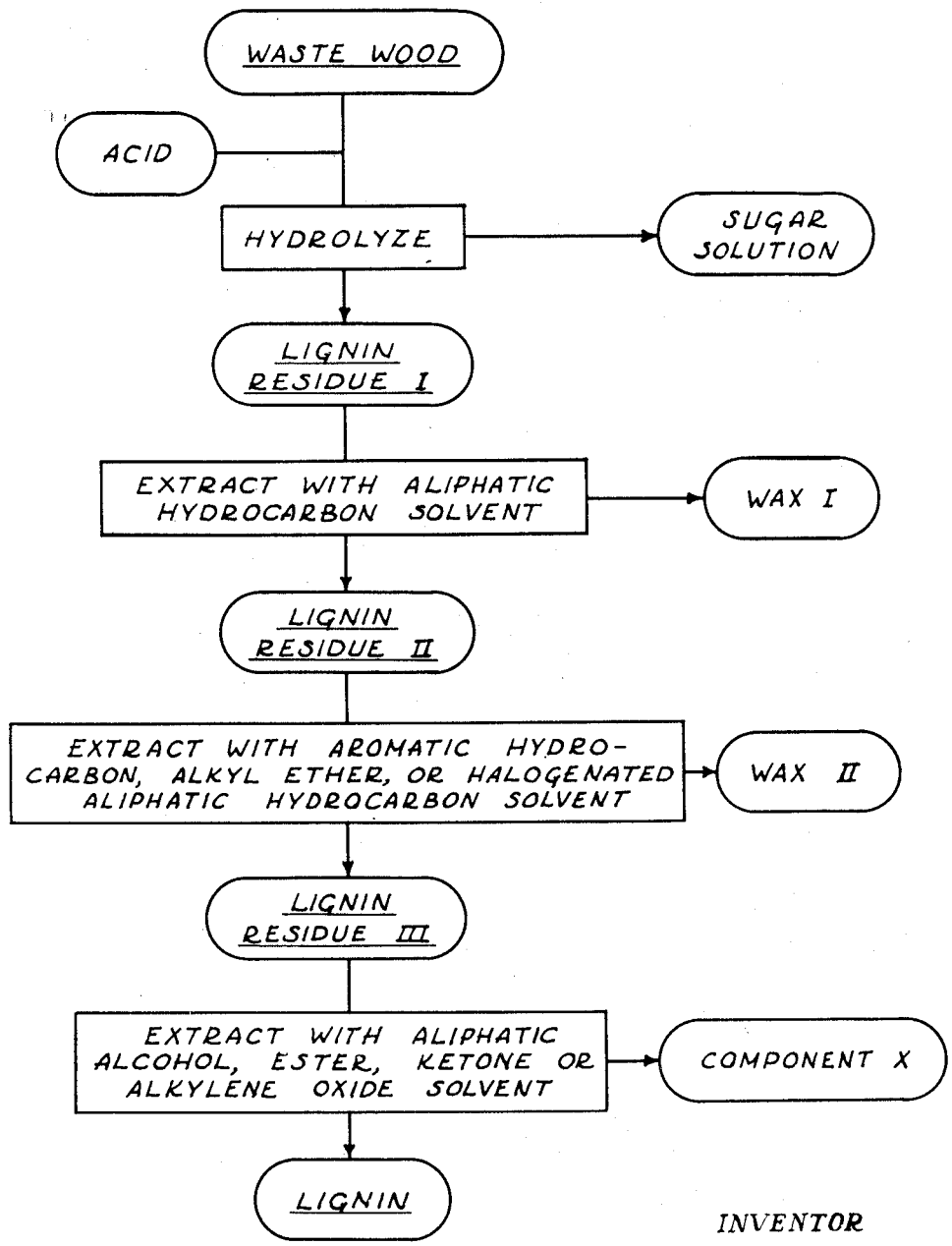
Figure 1 is a flow plan illustrating one process for the production of waxes from wood waste in accordance with the present invention.

In the flow plans, the names of solid products are underlined, the remaining (non-underlined) products being present in the form of solutions.

Wood from numerous species of trees, either hardwood or softwood, may be used as a raw material for the process of the present invention. Representative of suitable softwood species are the firs, including Douglas fir and white fir; the pines, including ponderosa pines, Eastern white pine, Western white pine, Southern yellow pine and sugar pine; the spruces, particularly white spruce; Eastern and Western hemlock; and Western larch. Illustrative of suitable hardwood species are the oaks, e. g. Southern red oak, the maples, the birches and the beeches. Of these various hardwood and softwood species, Douglas fir is particularly suitable for the purposes of the present invention since it yields substantial quantities of wax and is available in large quantities.

The wood of the foregoing and other species of trees may be used in the instant process in the form of slabwood, sawdust, shavings, bark, chips, hogged wood and other scrap materials which are produced as by-products of sawmill or logging operations and which currently are discarded or burned as fuel. To be susceptible to efficient utilization, however, the particle size of this material must be controlled. If it is too coarse, an excessively long time is required for the hydrolytic operation and if it is too fine, it tends to pack in whatever equipment is used for the hydrolysis. In general, sawdust having a particle size of about $\frac{1}{8}$ inch and over and chips or hogged wood in small pieces having maximum cross sections of from about $\frac{1}{8}$ inch to about $1\frac{1}{2}$ inches, lie within the optimum range for the purposes of the present invention. The sawdust and chips may be charged to the hydrolyzers separately, or in admixture with each other in suitable proportions, e. g., 40% hogged slabwood, 40% shavings, and 20% sawdust (by weight).

The hydrolysis of the wood waste may be effected by treatment with acid under conditions of acid concentration, temperature, pressure and reaction times calculated to convert the cellulose and hemicellulose content of the wood substantially completely to simple sugars. These, being soluble in water, dissolve in the acid solution, leaving an insoluble residue largely comprising lignin and containing the waxes which it is desired to isolate. Since the latter are sensitive to the action of oxidizing agents, the hydrolysis must be carried out using acids which do not have an oxidizing action. Representative non-oxidizing acids which may thus be used are sulfuric acid, sulfurous acid, hydrochloric acid, hydrobromic acid, hydrofluoric acid, phosphoric acid, phosphorous acid, formic acid, acetic acid, chloracetic acid, propionic acid, chloropropionic acid, oxalic acid and tartaric acid. Of these, sulfuric acid is preferred because of its efficient action and relatively low cost. The presently described process for the production of waxes is particularly well adapted to operation in conjunction with processes for the hydrolysis of wood waste with dilute sulfuric acid to form solutions of simple sugars, which may be fermented with yeast to industrial ethyl alcohol or with acetobacteria to lactic and acetic acids.

In accordance with such processes, wood waste in the form of chips or small pieces is introduced into a reaction vessel, which may be either a rotary or a stationary digester, equipped with means for introducing acid solution and steam, as well as means for withdrawing the sugar solution and lignin residue which are the principal products of the hydrolytic reaction. The digester preferably is designed in such a manner that the acid solution is introduced at or near the top and percolates downwardly through the charge of waste wood until it reaches the bottom, where it is withdrawn. It is desirable to pack the contents of the digester in order to increase the total charge, as well as to distribute it more evenly and to remove entrapped air. This may be accomplished by opening the bottom of the digester to the atmosphere, and suddenly applying steam pressure to the top. The digester is alternately charged and packed in this manner until full, when it will contain from 12 to 16 pounds of wood per cubic foot.

The wood then is treated with dilute sulfuric acid having a concentration of between about 0.4% and about 1.0% by weight at temperatures of between about 140° C. and about 190° C., and corresponding pressures for saturated steam, i. e. pressures of between about 38 pounds per square inch and about 168 pounds per square inch. Temperatures within this range are employed, since at temperatures below 140° C. the hydrolytic reactions proceed very slowly, while at temperatures above 190° C. secondary reactions occur which lead to the formation of furfural, levulinic acid, resins, etc., and which reduce the final yield of sugars. Before the addition of the acid, steam under pressure is passed into the digester to bring the temperature of the charge up to about 160° C. and to flush out air which may be trapped between the chips. Dilute sulfuric acid then is added, either continuously or batchwise. If the latter, a quantity of dilute sulfuric acid equal in weight to about one and one-half to two times the dry weight of the wood is introduced initially into the digester. This acid preferably has a concentration of about 1.2% by weight, in order that upon dilution by the moisture present in and on the wood, the final concentration of the acid will fall within the desired range.

After addition of the acid, steam under pressure is introduced into the digester, thereby increasing the temperature to about 185° C. and the pressure to about 150 pounds per square inch. These conditions of temperature, pressure, and acid concentration are maintained for a time period of between about 2 minutes and about 30 minutes, preferably about 10 minutes, to permit penetration of the acid into the wood and the partial hydrolysis of the cellulose and hemicellulose. Upon the expiration of this time, the sugar-containing hydrolytic reaction medium is withdrawn from the bottom of the digester. This completes the first cycle of operation.

The partially hydrolyzed wood within the digester then is treated with a further quantity of dilute sulfuric acid in a second operating cycle. This time the total quantity of acid used is equal to about 50% to 75% of the weight of the original charge of wood, and its concentration is about 0.5% by weight. The temperature and pressure of operation are again about 185° C. and about 150 pounds per square inch, respectively, and the treating time is about 10 minutes. After the second hydrolytic period is complete, the sugar solution is withdrawn from the digester and combined with that obtained from operation of the first cycle. Batch treatments of the wood are continued in this manner until the cellulose and hemicellulose content thereof has been converted substantially completely to simple sugars. This may require from ten to twenty cycles and an over-all hydrolysis time of from about 1½ to about 10 hours, depending largely upon the type of wood being treated.

Alternatively and preferably, however, the hydrolysis of the wood may be carried out continuously by introducing dilute sulfuric acid continuously at the top of the digester and continuously removing the sugar-containing solution from the bottom thereof. The conditions maintained within the digester are substantially the same as those used for batch operations. The digester and contents are first brought up to a temperature of about 160° C. Sulfuric acid having an initial concentration of about 1.2% by weight then is introduced into the top of the digester and allowed to percolate downwardly through the charge, the concentration of the added acid being reduced as the hydrolysis proceeds so as to maintain an acid concentration of about 0.5% by weight. Steam under pressure is introduced into the digester throughout the process as necessary to maintain a temperature of about 185° C. and a pressure of about 150 pounds per square inch. The rate of flow of the acid solution is adjusted so that the contact time with the wood is about ten minutes, and the treatment is continued for a total period of about 1½ to about 10 hours.

The reactions occurring when wood is treated with dilute acid under the foregoing conditions are relatively complex and not fully characterized. The cellulose and hemicellulose content of the wood is converted, however, to simple sugars which pass into solution. The lignin is relatively resistant to hydrolysis and remains as an insoluble residue, possibly in modified form. Formed and/or released from the structure of the wood under the conditions employed in the hydrolysis are substantial quantities of waxes, which, being insoluble in the aqueous hydrolytic mixture, are found in admixture with the lignin residue. It is of the utmost significance in connection with the present invention that these waxes are not obtainable directly from raw wood or bark in the form or in the amount in which they are obtained by the process described herein. Although waxes may be obtained by the extraction of raw wood or bark with suitable solvents, they are obtained in relatively small amounts and in the form of complex mixtures which can not readily be resolved into their individual component waxes, or into well defined fractions of waxes having closely related properties. It is apparent, therefore, that the waxes produced from wood in accordance with the process described herein either are released from the wood upon hydrolysis of the latter, or actually are synthesized during the hydrolysis reaction. The latter is a distinct possibility, since it is recognized that higher fatty acids and aliphatic alcohols are degradation products resulting from the hydrolysis of wood. It is not improbable, therefore, that in the presence of dilute acid there may occur equilibrium reactions whereby the higher fatty acids combine with the higher aliphatic alcohols to form waxes as relatively insoluble end products.

Thus, there are obtained as primary products of the hydrolysis of wood with dilute acid, as described above, an acid solution of simple sugars, and a wax-containing lignin residue. The sugar solution contains up to about 70% by weight of the wood originally charged to the digester. It has a solids content of about 5% by weight, and a reducing sugar content of from 3% to about 5% by weight. Sugars which may be present are glucose, galactose, mannose, xylose and arabinose if soft woods comprise the raw material, and xylose and glucose if the starting materials are hardwoods. These may be converted to industrial ethyl alcohol by conventional methods, as by neutralizing the acid sugar solutions obtained from the digester with lime or other basic material, adjusting the pH of the solution to a value of from 4.8 to 5.6, adding nutrient materials, inoculating with appropriate strains of yeast, and fermenting.

The wax-containing lignin residue remaining in the digester after removal of the sugar solution is removed from the digester by application of steam pressure and may, if desired, be pressed and washed with water for removal of acid and of further quantities of sugar solution. It may then be dried, whereupon it is obtained as a dark brown, friable material. The yield of lignin residue varies between about 25% and about 40% by weight, depending upon the species of wood treated and the completeness with which the hydrolysis is carried out. When Douglas fir wood waste is hydrolyzed under the conditions outlined above, the yield of lignin residue is about 30% by weight. After drying, it is ready for treatment for removal of its wax content.

One method for separating the waxes from the lignin residue is outlined in Figure 1. In accordance with the procedure outlined therein, the lignin residue (lignin residue I) is first extracted with a solvent for the removal of a soluble wax fraction (wax I) and the formation of a second lignin residue (lignin residue II). This extraction is carried out using solvents which will dissolve wax I selectively, leaving the remaining wax content of the lignin residue unaffected. Such solvents comprise the lower aliphatic hydrocarbons, i. e. the members of this series boiling below about 200° C., preferably below about 125° C. and including the pentanes, the hexanes, the heptanes, the octanes, the nonanes and the decanes. The foregoing solvents may be used singly or in admixture with each other. A preferred solvent for the selective extraction of wax I is a mixture of hydrocarbons of petroleum origin comprising the naphtha fraction intermediate between petroleum ether and ligroin and boiling at between about 60° C. and about 72° C. ("Skelley Solvent B").

To obtain wax I from lignin residue I, the latter is extracted exhaustively with the aliphatic hydrocarbon solvent at about its boiling temperature. Any suitable type of apparatus may be employed for the extraction, although it is preferred to use an extracting system wherein hot solvent is allowed to percolate continuously through a quantity of the residue and the resulting solution of wax in solvent is withdrawn from the extraction vessel and distilled or stripped with steam for removal of the solvent and separation of the solid wax. The solvent then is recycled to the extraction vessel for further treatment of the lignin residue. The extraction of wax I from the latter is continued in this manner until complete, which requires a time period of from about ½ hour to about 15 hours, usually about 4–6 hours. Properties of a typical sample of wax I as thus obtained are as follows:

*Table I*

| | |
|---|---|
| Melting point (ASTM, °C.) | 63–64 |
| Acid number | 42–44 |
| Saponification number | 73–100 |
| Unsaponifiable content (per cent by wt.) | 30–37 |
| Iodine number | 26–28 |

Wax I is a light-colored, relatively soft, waxy-appearing material which closely resembles beeswax in color, odor and appearance. It is soluble in a wide range of organic solvents, including the halogenated and non-halogenated lower aliphatic hydrocarbons, the liquid aromatic and cyclic hydrocarbons, and the lower aliphatic alcohols, esters, ketones and ethers. In addition, it is insoluble in cold, dilute aqueous solutions of bases, as well as in cold or hot solutions of acids. Upon treatment with a hot dilute solution of sodium hydroxide or other base, it is saponified to produce an acid fraction comprising higher fatty acids, and a neutral fraction which appears to be a mixture of higher aliphatic alcohols.

Lignin residue II, remaining after removal of wax I, is extracted with solvents for separation of another wax fraction, identified herein as wax II. Solvents which may be used for this purpose are those which selectively will extract wax II, leaving unaffected the remaining constituents of lignin residue II. They comprise members of the class consisting of the aromatic hydrocarbons boiling up to about 200° C., preferably up to about 125° C., and the lower alkyl ethers and the halogenated aliphatic hydrocarbons having about the same boiling points. Representative aromatic hydocarbons which may thus be used are benzene, toluene, ethyl benzene, methyl ethyl benzene, and the xylenes. Aromatic fractions resulting from the refining processes of the petroleum industry and comprising complex mixtures of aromatic hydrocarbons also may be used. Typical lower alkyl ethers which may be employed for the purposes of the invention are diethyl ether, methyl ethyl ether, methyl propyl ether, ethyl propyl ether and the dipropyl ethers, e. g. diisopropyl ether. Suitable halogenated hydrocarbons for this use comprise dichlormethane, trichlorethylene, carbon tetrachloride, chloroform, propyl bromide, isopropyl bromide, n-butyl bromide, sec-butyl bromide, isobutyl bromide, n-butyl chloride, sec-butyl chloride, isobutyl chloride, the amyl chlorides, ethylene chloride, ethylene bromide, and ethylidene chloride. The foregoing solvents may be used singly or in admixture with each other. It is preferred, however, to use commercial benzene or trichlorethylene.

The procedure followed for the separation of wax II is similar to that outlined above for obtaining wax I from lignin residue I in that lignin residue II is extracted exhaustively with solvent at or near the boiling temperature of the same for a time period of between about ½ and about 15 hours, preferably between about 4 hours and about 6 hours. During the extraction, the wax solution is removed from the extractor and stripped with steam or distilled for removal of the solvent, which is recycled.

As thus isolated, wax II is obtained in a yield of about 3-4% by weight, based upon the weight of lignin residue I. It is a dark-colored (brown), waxy-appearing material, somewhat harder than wax I and having the properties given in Table II:

*Table II*

| | |
|---|---|
| Melting point (ASTM, °C.) | 63-70 |
| Acid number | 70-90 |
| Saponification number | 115-130 |

Although wax II is insoluble in lower aliphatic hydrocarbons, it is soluble in the halogenated aliphatic hydrocarbon solvents, the aromatic hydrocarbon solvents, the lower alkyl ethers, the lower aliphatic alcohols, esters, and ketones, and the alkylene ethers. It is insoluble in cold or hot acid solutions and in cold solutions of bases. However, it may be saponified to form a mixture of higher fatty acids and alcohols upon treatment with a hot solution of dilute alkali.

After separation of wax II, lignin residue III may be extracted with an appropriate solvent for the removal of a material of unknown composition which is identified herein as component X. The extraction is carried out in a manner similar to that employed in the separation of wax I and wax II, lignin residue III being extracted with hot solvent until all of the extractible material has been removed. The solvents employed for this purpose are the lower aliphatic alcohols, esters, ketones, and alkylene oxides. Representative lower aliphatic alcohols which may thus be employed are methanol, ethanol, propanol, isopropanol, the butanols and the pentanols. Typical lower aliphatic esters which may be used for the extraction of component X are methyl acetate, methyl propionate, methyl butyrate, ethyl acetate, ethyl propionate, ethyl butyrate, propyl acetate, propyl propionate, propyl butyrate, butyl acetate, and amyl acetate. Lower aliphatic ketones suitable for use in this extraction are acetone, methyl ethyl ketone, diethyl ketone, ethyl propyl ketone, methyl propyl ketone, dipropyl ketone, and diisobutyl ketone. Illustrative of suitable alkylene oxides are tetramethylene oxide, pentamethylene oxide, and, particularly, diethylene oxide (1,4-dioxan). These may be used singly or in admixture with each other. Of the foregoing, acetone is preferred for the purposes of the present invention.

Component X is obtained in a yield of about 6% by weight, based on the weight of lignin residue I. It is a dark brown material which is of a gummy consistency resembling pitch at ordinary temperatures. On heating, it softens but does not have a definite melting point. It is insoluble in the halogenated and non-halogenated lower aliphatic hydrocarbons, the aromatic hydrocarbons and the lower alkyl ethers, but soluble in the lower aliphatic alcohols, esters and ketones and in the alkylene oxides. It is insoluble in cold or hot acid solutions. In contradistinction to waxes I and II, it is readily soluble in cold, dilute alkali. These various properties indicate that component X is a relatively complex mixture of high molecular weight acidic bodies which probably are phenolic in character. Its exact composition is, however, unknown.

After the removal of wax I, wax II, and component X from lignin residue I in the manner described above, there remains a residue which is insoluble in any of the solvents employed in the various extraction steps. This is essentially pure lignin, although it may contain varying quantities of unhydrolyzed cellulose, depending upon the completeness with which the wood waste was hydrolyzed. It may be removed from the extraction apparatus, dried and used in any of the several applications for which lignin is adapted.

An alternate procedure for recovering the wax content of lignin residue I is outlined in Figure 2. In accordance with this procedure, lignin residue I obtained from the acid hydrolysis of wood waste is extracted first with a lower aliphatic alcohol, ester, ketone or alkylene oxide solvent, thereby removing wax I, wax II, and component X in one operation. The mixture of these three substances then is resolved into its components. This procedure has the advantage over that outlined in Figure 1 in that a wet or dry lignin residue is extracted with solvent at only one step in the procedure, thus avoiding repeated extractions of this comparatively bulky material with attendant solvent losses, necessary use of massive equipment, and similar disadvantages. It also leads to the isolation of component X as one product and a mixture of wax I and wax II as another product, both of which products may be desired for special applications.

As indicated in Figure 2, lignin residue I first is extracted exhaustively with a solvent which preferably is acetone. This extraction step is carried out in a manner similar to that in which the corresponding extraction is executed under the procedure of Figure 1, discussed in detail hereinabove. As products of the extraction, there are obtained a residue of substantially pure lignin and a solution of wax I, wax II and component X in the solvent (wax mixture I). The solvent being miscible with water, or appreciably soluble therein, is removed by distillation, rather than by stripping with steam. The solid mixture of wax I, wax II, and component X remaining after removal of the solvent then is exhaustively extracted in suitable apparatus with an aromatic hydrocarbon solvent (preferably benzene), a lower alkyl ether, or a halogenated aliphatic hydrocarbon, the solvent and the procedure used in this extraction being substantially the same as in the corresponding extraction of the procedure of Figure 1. As products of the extraction, there are obtained a solution of wax I and wax II (wax mixture II) in the solvent, and, as a solid residue, component X.

Wax mixture II may be obtained in solid form by distilling or blowing with steam in order to remove the solvent. It then may be used per se or, if desired, processed for the separation of its component waxes. In the latter case, it is extracted exhaustively with an aliphatic hydrocarbon solvent, e. g. petroleum solvent, in which, as disclosed above, wax I is soluble and wax II is insoluble. There thus are obtained a solid residue comprising wax II and a solution containing wax I. This solution may then be distilled or steam blown for the recovery of wax I in solid form.

Still another process for the separation of waxes from lignin residue I is illustrated in Figure 3. This process is designed to isolate as products lignin, wax I, and a mixture of wax II and component X. It shares with the process of Figure 2 the advantage of extracting the bulky lignin residue but a single time, the steps by which the individual waxes are separated being practiced upon extractive residues of relatively small volume.

In this process, as in the process of Figure 2, lignin residue I is extracted exhaustively with a lower aliphatic alcohol, ester, or ketone or with an alkylene oxide, thereby forming a solution containing wax mixture I, and a solid residue comprising lignin. The solvent is removed by distillation, and the resultant solid wax mixture extracted with an aliphatic hydrocarbon solvent. This forms a solution of wax I, and a solid residue comprising a mixture of wax II and component X (wax mixture III). The solvent may be removed from the solution to isolate wax I in solid form, while the solid residue may be extracted exhaustively with an aromatic hydrocarbon solvent, a lower alkyl ether or a chlorinated aliphatic hydrocarbon for separation of wax II (solution) from component X (insoluble residue).

Still a further procedure for separating waxes from lignin residue I resulting from the acid hydrolysis of wood waste is disclosed in Figure 4. In this process, wax I and wax II are obtained either as a composite fraction, or separate from each other, while the lignin is isolated together with component X. This procedure is preferred over those of Figures 1, 2, and 3, since (1) a useful wax mixture which may easily be separated into its component waxes is obtained directly from lignin residue I; (2) component X which appears to have less utility than the waxes is separated together with the lignin, which also is of relatively low value; and (3) as in the case of the procedures of Figures 2 and 3, but a single extraction of the lignin-containing fraction is required to separate the waxes therefrom. It thus affords the most direct and economical method of obtaining waxes from wood waste.

In accordance with this procedure, lignin residue I is extracted first with an aromatic hydrocarbon solvent, a lower alkyl ether, or a chlorinated aliphatic hydrocarbon, using the techniques described hereinabove as being applicable for carrying out extractions with solvents of this class. This forms a solution of wax I and wax II (wax mixture II) in solvent and a solid residue (lignin residue III) comprising a mixture of lignin and component X. The solvent may be removed from wax mixture II to form a solid mixture of wax I and wax II. This may be used per se, or, if it is desired to separate the two waxes, it may be extracted with an aliphatic hydrocarbon solvent thereby removing wax I in solution and leaving wax II as a solid residue.

Similarly, lignin residue III may be used without further treatment or, alternatively, treated for separation of its components. If the latter, the residue is extracted with a lower aliphatic alcohol, ester, ketone or alkylene oxide solvent, e. g. acetone, until component X has been dissolved and removed from the lignin, which is insoluble in these solvents.

The process of the invention is illustrated by the following examples.

*Example 1*

A quantity of lignin residue I (lignin admixed with wax I, wax II, and component X) was prepared by hydrolyzing hogged Douglas fir slabwood with dilute sulfuric acid. The wood was in the form of pieces having maximum cross-sections of from ⅛ inch to 1½ inches. It was placed in a stationary digester, brought to an initial temperature of 160° C. by introduction of steam, and treated batch-wise with the acid. A quantity of 1.2% sulfuric acid was added at the top of the digester, the weight of added acid being 1¾ times the dry weight of the wood to be treated. It was allowed to remain in contact with the wood for ten minutes, steam being continuously passed into the digester during this time in order to elevate the temperature to 185° C. and the pressure to 150 pounds per square inch, and to maintain the temperature and pressure at these levels for the entire reaction period.

The acid solution, which contained sugars resulting from the hydrolysis of the cellulose and hemicellulose content of the wood, then was withdrawn from the bottom of the digester and the partially hydrolyzed contents thereof treated with another batch of dilute sulfuric acid. The acid used in this cycle had a concentration of 0.5% by weight, and was used in amount equal to 60% by weight of the dry weight of the wood originally charged to the digester. The treatment again was carried out for ten minutes at a temperature of 185° C. and a pressure of 150 pounds per square inch. The resulting sugar solution then was withdrawn and combined with that obtained from the first cycle.

The contents of the digester were treated with dilute sulfuric acid under the conditions described above for the operation of the second cycle for a total of 15 acid treatments and an over-all treating time of three hours. At the end of this time, the hydrolysis of the wood was substantially complete, the residue remaining in the digester being the mixture of lignin and waxes referred to herein as lignin residue I.

*Example 2*

A quantity of lignin residue I was prepared by the procedure described in Example 1 with the exception that the treatment of the wood with acid was continuous, rather than batchwise. Hogged Douglas fir slabwood having maximum dimensions of from ⅛ inch to 1½ inches was placed in a percolator and heated with steam to a temperature of 160° C. Sulfuric acid having an initial concentration of 1.2% by weight was introduced into the top of the digester, allowed to percolate downwardly through its contents, and withdrawn continuously at the bottom. Steam was continually passed into the digester to raise the temperature and pressure to 185° C. and 150 pounds per square inch, respectively, and to maintain them at these values for the remainder of the reaction period. As the hydrolysis proceeded, the concentration of the added sulfuric acid was gradually reduced to 0.5% by weight in order to maintain the acid concentration within the digester at approximately this value. The treatment was continued for from 2½ to 3½ hours, after which the effluent sugar solution was processed for conversion to ethyl alcohol and the residual lignin (lignin residue I) was removed from the digester and treated for removal of its wax content by one of the procedures outlined in the following examples.

*Example 3*

In the manner set forth in Examples 1 and 2, but with somewhat longer hydrolytic times for the more resistant species, lignin residue I is obtained by the acid hydrolysis of various species of wood other than Douglas fir, such species including white fir, white spruce, Western red cedar, ponderosa pine, Eastern white pine, Western white pine, Southern yellow pine, sugar pine, Western larch, Western hemlock, red oak, maple, and yellow birch.

Example 4

In a manner similar to that described in Examples 1 and 2, lignin residue I is obtained from wood by the acid hydrolysis thereof under operating conditions substantially as specified in those examples but employing in place of dilute sulfuric acid one or more of the following acids, singly or in admixture with each other or with dilute sulfuric acid: sulfurous acid, phosphoric acid, hydrochloric acid, hydrobromic acid, formic acid, acetic acid, chloracetic acid, propionic acid, chloropropionic acid and oxalic acid. When using the weaker acids of this group, however, relatively long treating times (up to about 15 hours) and relatively high acid concentrations (up to about 10% by weight) are required for substantial hydrolysis of the cellulose and hemicellulose content of the wood.

Example 5

Lignin residue I obtained by any of the procedures described in the foregoing examples was processed for the recovery of its content of waxes. It was first dried and placed in an extractor in which hot solvent could be percolated continuously upwardly through the residue, the extract withdrawn, and distilled or stripped with steam for recovery of the solvent, which was recycled to the percolator. The extraction was carried out using a petroleum fraction ("Skelly Solvent B") boiling at 60–72° C. until all the material soluble in this reagent was removed. There was obtained in this manner a yield of 3–4% by weight of wax I, based on the weight of lignin residue I. It was a light colored (tan) material closely resembling beeswax in appearance and odor and having the properties set forth in Table I, above. In addition, it was soluble in the halogenated and non-halogenated hydrocarbon solvents, the aromatic hydrocarbon solvents, the lower alkyl ethers, and the hot lower aliphatic alcohols, esters, ketones and alkylene oxides. It was insoluble in cold or hot dilute acid solutions and in cold, dilute sodium hydroxide. It was saponified, however, by treatment with hot dilute sodium hydroxide to form a mixture of higher fatty acids and alcohols.

The residue (lignin residue II) remaining after removal of wax I then was extracted exhaustively with benzene. Upon removal of the solvent from the resulting solution, there was obtained another wax product, wax II, in a yield of 3–4% by weight based upon the weight of lignin residue I. Wax II was a dark brown, waxy-appearing material somewhat harder than wax I and differing from it further in being insoluble in the lower aliphatic hydrocarbon solvents. It was also insoluble in hot or cold acid solutions and in cold dilute solutions of alkalis. It was, however, soluble in the aromatic hydrocarbon solvents, the lower alkyl ethers, the halogenated aliphatic and the lower aliphatic alcohols, esters, ketones and alkylene oxides. It was saponified to a mixture of higher fatty acids and alcohols upon treatment with hot dilute sodium hydroxide. Other properties are given in Table II, above.

The residue (lignin residue III) remaining after removal of wax II was extracted exhaustively with acetone. The acetone was distilled from the resulting extract, leaving the dark brown, resinous appearing solid material of indefinite melting point which is identified herein as component X. It was obtained in a yield of 6% by weight, based on the weight of lignin residue I. It differed from waxes I and II in being insoluble in the halogenated and non-halogenated lower aliphatic hydrocarbon solvents, the aromatic hydrocarbon solvents, and the lower alkyl ethers. It was, moreover, readily soluble in cold, dilute solutions of sodium hydroxide. It was also soluble in the lower aliphatic alcohols, esters, ketones and the alkylene oxides.

Left in the extractor after the foregoing extractions was the lignin content of the original wood. It was substantially free of waxes, but contained small amounts of unhydrolyzed cellulose.

Example 6

In an alternate procedure for obtaining waxes from lignin residue I, the latter, obtained by any of the procedures given in Examples 1–4 inclusive was extracted exhaustively with acetone in an extractor of the type described in Example 5. This resulted in the formation of a lignin residue, which was withdrawn from the reactor and used as such, and an acetone solution containing a mixture (wax mixture I) of wax I, wax II, and component X. This solution was distilled for removal of the solvent. The residue remaining was exhaustively extracted with benzene, which dissolved wax I and wax II, but left component X undissolved. The benzene solution of the two waxes (wax mixture II) was stripped with steam to recover the solvent and yield a solid residue comprising the two waxes. This residue then was extracted with a petroleum fraction boiling at 60–72° C., thereby separating wax I (soluble) from wax II (insoluble).

Wax I, wax II and component X obtained by the foregoing procedure had substantially the same properties as had these products as obtained by the procedure of Example 5. Also, they were obtained in approximately the same yields as in that example.

Example 7

In still another procedure for separating waxes from lignin residue I, the latter was extracted with acetone to form wax mixture I in the manner outlined in Example 6. The solvent was distilled, and the remaining mixture of waxes extracted with petroleum naphtha boiling at 60–72° C. This separated wax I, which is soluble in aliphatic hydrocarbon solvents, from wax II and component X, which are insoluble in solvents of that class, and which remained undissolved as wax mixture III.

Wax mixture III was a dark brown, waxy-appearing material which could be used as such or treated further for separation into its components. To accomplish the latter, it was extracted with benzene, which dissolved wax II, but left component X undissolved as a solid residue. The benzene solution of wax II was then stripped with steam for removal of the solvent, leaving wax II as a solid product.

The yields and properties of wax I, wax II and component X obtained by the procedure of this example were substantially identical with the yields and properties of these products as obtained by the procedure of Example 5.

Example 8

In a procedure designed to separate wax I and wax II directly from lignin residue I, the latter was extracted exhaustively with benzene, using the procedure for solvent extraction set forth in Example 5. This resulted in the formation of a benzene solution of the two waxes (wax mixture II), and a solid residue (lignin residue III) comprising lignin admixed with component X. The solution of waxes in benzene was stripped with steam for removal of the benzene, leaving a solid mixture of the waxes. This mixture was separated into its constituent waxes by extracting with petroleum naphtha boiling at 60–72° C., thus forming a naphtha solution of wax I and leaving a solid residue wax II as the insoluble fraction.

Component X was separated from lignin residue III by extracting the latter with acetone, component X being soluble in that solvent, and lignin insoluble.

As in the case of Examples 6 and 7, the yields and properties of wax I, wax II and component X obtained in this example were substantially identical with the yields and properties of these products as obtained by the procedure of Example 5.

*Example 9*

Wax I, wax II and component X are obtained from lignin residue I in a manner similar to that described in Examples 5, 6, 7, and 8, with the exceptions that:

(1) In place of the petroleum naphtha used as a solvent in those examples there are used the pentanes, the hexanes, the heptanes, the octanes, the nonanes, the decanes, singly or in admixture with each other or in admixture with petroleum naphtha;

(2) In place of the benzene used as a solvent in those examples there are used trichlorethylene, toluene, ethyl benzene, methyl ethyl benzene, the xylenes, the aromatic petroleum solvents, diethyl ether, diisopropyl ether, or mixtures thereof with each other or with benzene; and (3) In place of the acetone used as a solvent in those examples there are used methanol, ethanol, propanol, isopropanol, the butanols, the pentanols, methyl acetate, methyl propionate, methyl butyrate, ethyl acetate, ethyl propionate, ethyl butyrate, propyl acetate, propyl butyrate, butyl acetate, amyl acetate, methyl ethyl ketone, diethyl ketone, methyl propyl ketone, diisobutyl ketone, or 1,4-dioxan singly or in admixture with each other or in admixture with acetone.

The products obtained by the practice of the present invention are materials of great utility. As indicated above, wax I has properties similar to those of beeswax and preliminary tests indicate it to be the full equivalent of the latter for many uses. Thus, it may be used in the manufacture or compounding of candles, polishes, floor waxes, emulsions, coating or moisture proofing, electrical appliances, cosmetic creams, and rust proofing and insulating compositions. It may also be used in molding, as a plasticizer for plastics, in fruit dipping, and in a multiplicity of other applications. Wax II and component X likewise have many potential applications, as in moisture sealing processes and compositions and as diluents for wax I in applications wherein a light colored wax is not essential.

The economic significance of the present discovery is apparent when it is considered that although the United States produces about 4 million pounds of beeswax per annum, it imports an additional 7 million to 8 million pounds each year in order to meet the many industrial needs for this material. Application of the presently described process in the operation of but a single plant for the utilization of wood waste (Springfield, Oregon alcohol plant) would produce in excess of 5,000 pounds of wax I per day and an approximately equal amount of wax II. It thus would produce nearly 2 million pounds of wax I per year, which would go far toward making this country self-sufficient with regard to waxes of this general character. It also would tend to make these products available at lower cost. The present process is still further significant in that, as noted hereinabove, it makes commercially attractive the treatment of chips, bark, slabwood, shavings and other wood waste for the recovery of valuable products, thus utilizing profitably what heretofore has been a substantially valueless material.

Having now described my invention in preferred embodiments, what I claim as new and desire to protect by Letters Patent is:

1. The process for the production of wax from wood which comprises hydrolyzing the cellulose and hemicellulose content of the wood with acid, separating the resulting sugar-containing solution from the resulting lignin-containing solid residue, and solvent extracting the said residue for recovery of wax therefrom.

2. The process of producing wax from wood which comprises subjecting the wood in the form of small pieces to the action of a dilute aqueous solution of acid at temperatures and pressures sufficiently elevated to convert to simple sugars the cellulose and hemicellulose content of the wood, but not so high as to carbonize the wood, separating the resulting aqueous sugar solution from the resulting solid lignin residue, and extracting the said residue with solvent for the recovery of wax therefrom.

3. The process of producing wax from wood which comprises reducing the wood to small pieces, subjecting the pieces to the action of dilute sulfuric acid having a concentration of between about 0.4% and about 1.0% by weight at temperatures of between about 140° C. and about 190° C. and corresponding pressures for saturated steam, for a time sufficient to hydrolyze the cellulose and hemicellulose content of the wood substantially completely to water soluble simple sugars, thereby producing substantial quantities of solid wax from the wood substance and leaving a solid residue comprising substantially lignin together with the said wax, separating the aqueous sugar solution from the solid residue, and solvent extracting the said residue for recovery of its wax content.

4. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar solution from the lignin containing residue; and extracting the said residue with a solvent comprising a lower aliphatic hydrocarbon for the separation of wax therefrom.

5. The process of claim 4 wherein the lower aliphatic hydrocarbon solvent comprises a petroleum naphtha fraction boiling at between about 60° C. and about 72° C.

6. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said lignin-containing residue with a lower aliphatic hydrocarbon solvent, thereby forming a solution of a first wax product and a second lignin-containing residue; separating the solution of the first wax product from the second lignin-containing residue; and extracting the said second lignin-containing residue with a solvent comprising at least one member of the group consisting of the aromatic hydrocarbons which are fluid at ordinary temperatures and pressures, the lower alkyl ethers, and the lower halogenated aliphatic hydrocarbons for the separation of a second wax product.

7. The process of claim 6 wherein the solvent employed for extracting the second lignin-containing residue comprises benzene.

8. The process of claim 6 wherein the solvent employed for extracting the second lignin-containing residue comprises diethyl ether.

9. The process of claim 6 wherein the solvent employed for extracting the second lignin-containing residue comprises trichlorethylene.

10. The process which comprises reacting wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said lignin-containing residue with a lower aliphatic hydrocarbon solvent, thereby forming a solution of a first wax product and a second lignin-containing residue; separating the solution of the first wax product from the second lignin-containing residue; extracting the said second lignin-containing residue with a solvent comprising at least one member of the group consisting of the aromatic hydrocarbons which are fluid at ordinary temperatures and pressures, the lower alkyl ethers, and the lower halogenated aliphatic hydrocarbons, thereby forming a solution of a second wax product and a third lignin-containing residue; separating the solution of the second wax product from the third lignin-containing residue; and extracting the said third lignin-containing residue with a solvent comprising at least one member of the group consisting of the lower aliphatic alcohols, lower aliphatic esters, lower aliphatic ketones, and alkylene oxides, whereby to separate therefrom a solution containing a pitch-like product and a solid residue substantially comprising lignin.

11. The process of claim 10 wherein the solvent employed for extracting the second lignin-containing residue comprises a fluid aromatic hydrocarbon and the solvent employed for extracting the third lignin-containing residue comprises a lower aliphatic ketone.

12. The process of claim 10 wherein the solvent employed for extracting the second lignin-containing residue comprises benzene and the solvent employed for extracting the third lignin-containing residue comprises acetone.

13. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; and extracting the said residue with a solvent comprising at least one member of the group consisting of the lower aliphatic alcohols, lower aliphatic esters, lower aliphatic ketones, and alkylene oxides for the separation of a mixture of waxes therefrom.

14. The process of claim 13 wherein the solvent employed is a lower aliphatic ketone.

15. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said residue with a solvent comprising at least one member of the group consisting of the lower aliphatic alcohols, lower aliphatic esters, lower aliphatic ketones, and alkylene oxides, thereby forming a solution containing a first wax mixture and a residue substantially comprising lignin; separating the solution of the first wax mixture from the residue substantially comprising lignin; removing the solvent from the solution of the first wax mixture to isolate the same as a solid product; and extracting the solid first wax mixture with a solvent comprising at least one member of the group consisting of the aromatic hydrocarbons which are fluid at ordinary temperatures and pressures, the lower alkyl ethers, and the lower halogenated aliphatic hydrocarbons, thereby separating a second wax mixture comprising substantially pure waxes (in solution) from a solid, pitch-like residue.

16. The process of claim 15 wherein the solvent employed for the extraction of the lignin residue is a lower aliphatic ketone and the solvent employed for extracting the solid first wax mixture is a fluid aromatic hydrocarbon.

17. The process of claim 15 wherein the solvent employed for the extraction of the lignin residue comprises acetone and the solvent employed for extracting the solid first wax mixture comprises benzene.

18. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said residue with a solvent comprising at least one member of the group consisting of the lower aliphatic alcohols, lower aliphatic esters, lower aliphatic ketones, and alkylene oxides; thereby forming a solution containing a first wax mixture and a residue substantially comprising lignin; separating the solution of the first wax mixture from the residue substantially comprising lignin; removing the solvent from the solution of the first wax mixture to isolate the same as a solid product; extracting the solid first wax mixture with a solvent comprising at least one member of the group consisting of the aromatic hydrocarbons which are fluid at ordinary temperatures and pressures, the lower alkyl ethers, and the lower halogenated aliphatic hydrocarbons, thereby forming a solution of a second wax mixture and a solid residue comprising a pitch-like product; separating the solution of the second wax mixture from the pitch-like solid residue; removing the solvent from the solution of the second wax mixture to isolate the same as a solid product; and extracting the solid second wax mixture with a solvent comprising a lower aliphatic hydrocarbon to separate a first wax product (in solution) from a second wax product (insoluble residue).

19. The process of claim 18 wherein the solvent employed for the extraction of the lignin residue comprises a lower aliphatic ketone, the solvent employed for the extraction of the solid first wax mixture comprises a fluid aromatic hydrocarbon, and the solvent employed for the extraction of the solid second wax mixture comprises petroleum naphtha.

20. The process of claim 18 wherein the solvent employed for the extraction of the lignin residue comprises acetone, the solvent employed for the extraction of the solid first wax mixture comprises benzene, and the solvent employed for the extraction of the solid second wax mixture comprises a petroleum naphtha boiling at between about 60° C. and about 72° C.

21. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue, extracting the said residue with a solvent comprising at least one member of the group consisting of the lower aliphatic alcohols, lower aliphatic esters, lower aliphatic ketones, and alkylene oxides, thereby forming a solution containing a first wax mixture and a residue substantially comprising lignin; separating the solution of the first wax mixture from the residue substantially comprising lignin; removing the solvent from the solution of the first wax mixture to isolate the same as a solid product, and extracting the solid first wax mixture with a lower aliphatic hydrocarbon solvent, thereby separating a first wax product (in solution) from a solid residue comprising a second wax product in admixture with a pitch-like material.

22. The process of claim 21 wherein the solvent employed for the extraction of the lignin residue comprises a lower aliphatic ketone and the solvent employed for extracting the solid first wax mixture comprises petroleum naphtha.

23. The process of claim 21 wherein the solvent employed for the extraction of the lignin residue comprises acetone and the solvent employed for extracting the solid first wax mixture comprises a petroleum naphtha boiling at between about 60° C. and about 72° C.

24. The process which comprises reacting wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin containing residue; extracting the said residue with a solvent comprising at least one member of the group consisting of the lower aliphatic alcohols, lower aliphatic esters, lower aliphatic ketones, and alkylene oxides, thereby forming a solution containing a first wax mixture and a residue substantially comprising lignin; separating the solution of the first wax mixture from the residue substantially comprising lignin; removing the solvent from the solution of the first wax mixture to isolate the same as a solid product; extracting the solid first wax mixture with a lower aliphatic hydrocarbon solvent to form a solution of a first wax product and a solid residue comprising a second wax product in admixture with a pitch-like material; separating the solution of the first wax product from the residue comprising a second wax product in admixture with a pitch-like material; and extracting the said residue comprising a second wax product and a pitch-like material with a solvent comprising at least one member of the group consisting of the aromatic hydrocarbons which are fluid at ordinary temperatures and pressures, the lower alkyl ethers, and the lower halogenated aliphatic hydrocarbons, thereby separating the second wax product (solution) from the pitch-like material (insoluble residue).

25. The process of claim 24 wherein the solvent employed for extracting the lignin residue comprises a lower aliphatic ketone, the solvent employed for extracting the solid first wax mixture comprises petroleum naphtha, and the solvent employed for extracting the residue comprising a second wax product and pitch-like material comprises a fluid aromatic hydrocarbon.

26. The process of claim 24 wherein the solvent employed for extracting the lignin residue comprises acetone, the solvent employed for extracting the solid first wax mixture comprises a petroleum naphtha boiling between about 60° C. and about 72° C., and the solvent employed for extracting the residue comprising a second wax product and pitch-like material comprises benzene.

27. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; and extracting the said residue with a solvent comprising at least one member of the group consisting of the aromatic hydrocarbons which are fluid at ordinary temperatures and pressures, the lower alkyl ethers, and the lower halogenated aliphatic hydrocarbons; thereby dissolving the wax content of the said residue and leaving a wax-free lignin residue.

28. The process of claim 27 wherein the solvent employed comprises benzene.

29. The process of claim 27 wherein the solvent employed comprises diethyl ether.

30. The process of claim 27 wherein the solvent employed comprises trichlorethylene.

31. The process of producing wax from wood which comprises reacting the wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said residue with a solvent comprising at least one member of the group consisting of the aromatic hydrocarbons which are fluid at ordinary temperatures and pressures, the lower alkyl ethers, and the lower halogenated aliphatic hydrocarbons; thereby forming a solution containing the wax content of the said residue and a solid, wax-free lignin product; separating the wax-containing solution from the solid, wax-free lignin product; removing the solvent from the wax-containing solution to form a solid mixture of waxes; and extracting the solid mixture of waxes with a lower aliphatic hydrocarbon solvent to separate therefrom a first wax product (soluble) from a second wax product (insoluble).

32. The process of claim 31 wherein the solvent employed to remove the wax from the wax-containing lignin residue comprises an aromatic hydrocarbon solvent which is fluid at ordinary temperatures and pressures.

33. The process of claim 31 wherein the solvent employed to remove the wax from the wax-containing lignin residue comprises trichlorethylene.

34. The process which comprises reacting wood with an aqueous solution of acid, thereby hydrolyzing the cellulose and hemicellulose content of the wood to simple sugars and forming as products a sugar-containing solution and a wax-containing lignin residue; separating the sugar-containing solution from the lignin-containing residue; extracting the said residue with a solvent comprising at least one member of the group consisting of the aromatic hydrocarbons which are fluid at ordinary temperatures and pressures, the lower alkyl ethers, and the lower halogenated aliphatic hydrocarbons; thereby forming a solution containing the wax content of the said residue and a solid, wax-free lignin product; separating the wax-containing solution from the solid, wax-free lignin product; and extracting the solid, wax-free lignin product with a solvent comprising at least one member of the group consisting of the lower aliphatic alcohols, lower aliphatic esters, lower aliphatic ketones, and alkylene oxides, thereby separating a pitch-like material in solution and leaving as an insoluble residue a solid material substantially comprising lignin.

35. The process of claim 34 wherein the solvent employed to extract the solid, wax-free lignin product comprises a lower aliphatic ketone.

36. The process of claim 34 wherein the solvent employed to remove the wax from the wax-containing lignin residue comprises benzene and the solvent employed to extract the solid, wax-free lignin product comprises a lower aliphatic ketone.

37. The process of claim 34 wherein the solvent employed to remove the wax from the wax-containing lignin residue comprises trichlorethylene and the solvent employed to extract the solid, wax-free lignin product comprises a lower aliphatic ketone.

38. The wax product resulting from the acid hydrolysis of wood and extraction with solvent of the resulting acid insoluble lignin residue, the said wax product being insoluble in aqueous acid solutions; insoluble in cold, dilute solutions of bases; and soluble in the halogenated and non-halogenated lower aliphatic hydrocarbons, the liquid aromatic hydrocarbons, and the lower aliphatic alcohols, esters, ketones and ethers.

39. The wax product resulting from the acid hydrolysis of wood and extraction with solvent of the resulting acid insoluble lignin residue, the said wax product being insoluble in aqueous acid solutions; insoluble in cold, dilute solutions of bases; soluble in the halogenated and non-halogenated lower aliphatic hydrocarbons, the liquid aromatic hydrocarbons, and the lower aliphatic alcohols, esters, ketones and ethers; and also being characterized by the following properties:

| | |
|---|---|
| Color | Light tan |
| Melting point (ASTM, ° C.) | 63–64 |
| Acid number | 42–44 |
| Saponification number | 73–100 |
| Iodine number | 26–28 |

40. The wax product resulting from the acid hydrolysis of wood and solvent extraction of the resulting acid insoluble residue, the said wax product being insoluble in aqueous acid solutions; insoluble in cold, dilute solutions of bases; insoluble in the lower aliphatic hydrocarbons; and soluble in the halogenated lower aliphatic hydrocarbons, the liquid aromatic hydrocarbons, and the lower aliphatic alcohols, esters, ketones and ethers.

41. The wax product resulting from the acid hydrolysis of wood and solvent extraction of the resulting acid insoluble residue, the said wax product being insoluble in aqueous acid solutions; insoluble in cold, dilute solutions of bases; insoluble in the lower aliphatic hydrocarbons; soluble in the halogenated lower aliphatic hydrocarbons, the liquid aromatic hydrocarbons, and the lower aliphatic alcohols, esters, ketones and ethers; and having other properties as follows:

| | |
|---|---|
| Color | Brown |
| Melting point (ASTM, ° C.) | 63–70 |
| Acid number | 70–90 |
| Saponification number | 115–130 |

ERVIN F. KURTH.

REFERENCES CITED

The following references are of record in the file of this patent:

UNITED STATES PATENTS

| Number | Name | Date |
|---|---|---|
| 2,156,159 | Olson | Apr. 25, 1939 |
| 2,221,540 | Hall | Nov. 12, 1940 |
| 2,423,020 | Haun | June 24, 1947 |
| 2,453,213 | Farber | Nov. 9, 1948 |

OTHER REFERENCES

Fuchs, "Technical Association Papers," Series 19 (1936), pp. 117–120.